United States Patent
Satodate

(10) Patent No.: US 7,961,231 B2
(45) Date of Patent: Jun. 14, 2011

(54) APPARATUS, METHOD AND COMPUTER-READABLE RECORDING MEDIUM CONTAINING PROGRAM FOR PHOTOGRAPHING

(75) Inventor: Yoshihiro Satodate, Asaka (JP)

(73) Assignee: Fujifilm Corporation, Tokyo (JP)

( * ) Notice: Subject to any disclaimer, the term of this patent is extended or adjusted under 35 U.S.C. 154(b) by 633 days.

(21) Appl. No.: 12/007,661

(22) Filed: Jan. 14, 2008

(65) Prior Publication Data
US 2008/0170139 A1      Jul. 17, 2008

(30) Foreign Application Priority Data

Jan. 15, 2007   (JP) ................... 2007-005331

(51) Int. Cl.
H04N 9/64      (2006.01)
(52) U.S. Cl. ........................ 348/243; 348/241
(58) Field of Classification Search .................. None
See application file for complete search history.

(56) References Cited

U.S. PATENT DOCUMENTS

| | | | |
|---|---|---|---|
| 6,710,807 B1* | 3/2004 | Yamagishi | 348/362 |
| 6,710,808 B1* | 3/2004 | Yamagishi | 348/362 |
| 6,965,410 B1* | 11/2005 | Yamagishi | 348/362 |
| 7,339,620 B1* | 3/2008 | Yamagishi et al. | 348/243 |
| 2004/0095487 A1* | 5/2004 | Sato | 348/243 |
| 2005/0253934 A1* | 11/2005 | Yamagishi et al. | 348/222.1 |

FOREIGN PATENT DOCUMENTS

| | | |
|---|---|---|
| JP | 2000-184269 A | 6/2000 |
| JP | 2000-201294 A | 7/2000 |
| JP | 2000-224532 A | 8/2000 |
| JP | 2000-236477 A | 8/2000 |

OTHER PUBLICATIONS

Office Action dated Dec. 21, 2011 issued in corresponding Japanese patent application No. 2007-005331 (with English translation).

* cited by examiner

Primary Examiner — David L Ometz
Assistant Examiner — Angel L Garces-Rivera
(74) Attorney, Agent, or Firm — Birch, Stewart, Kolasch & Birch, LLP

(57) ABSTRACT

A photographing apparatus includes: a photographing unit having an image pickup device, the photographing unit carrying out first photographing for obtaining a first image with the image pickup device being set in an exposure state, and second photographing for obtaining a second image with the image pickup device being set in a light-shielded state; a correcting unit for correcting the first image based on the second image to obtain a corrected image; and a photographing controlling unit for controlling priorities between new first photographing and the second photographing if an instruction for carrying out the new first photographing is given during the second photographing.

18 Claims, 10 Drawing Sheets

APPARATUS, METHOD AND COMPUTER-READABLE RECORDING MEDIUM CONTAINING PROGRAM FOR PHOTOGRAPHING

BACKGROUND OF THE INVENTION

1. Field of the Invention

The present invention relates to a photographing apparatus and a photographing method for obtaining an image through photographing, and a computer-readable recording medium containing a program for causing a computer to carry out the photographing method.

2. Description of the Related Art

In an image pickup device, such as a CCD, used in digital cameras, dark current is generated when the image pickup device receives no light. The dark current is generated due to electron-hole pairs generated by thermal excitation of the semiconductor, and appears as noise in pixel values outputted from the image pickup device. In order to address this problem, various techniques for correcting for the dark current noise have been proposed.

For example, a technique has been proposed, in which, before or after a subject is photographed, a light-shielded image is obtained by carrying out photographing for the same length of time as the exposure time of the photographing of the subject in a state where the image pickup device is shielded from light, and image data of the light-shielded image is subtracted from image data of the image obtained by photographing the subject, thereby achieving correction for the dark current noise.

In a case where the light-shielded image is obtained in this manner, an approach has been proposed, in which the fact that the light-shielded image is being taken is informed to the photographer by displaying an indication of the fact on the monitor of a digital camera (see Japanese Unexamined Patent Publication No. 2000-224532). In another proposed approach, a shutter releasing operation is inhibited while the light-shielded image is taken (see Japanese Unexamined Patent Publication No. 2000-236477). In yet another proposed approach, if the shutter releasing operation is made when the light-shielded image is being taken, priority is given to the releasing operation and the light-shielded image is taken anew after the photographing has been finished (see U.S. Pat. No. 6,710,807). In further another proposed approach, timing for taking the light-shielded image, i.e., whether the light-shielded image is taken before or after the photographing, is set for each photographing mode of the digital camera (see Japanese Unexamined Patent Publication No. 2000-184269).

However, in the approach where the releasing operation is inhibited, the user may not carry out photographing at the moment he or she wants and may miss the right moment for releasing the shutter. In the approach described in Japanese Unexamined Patent Publication No. 2000-184269, the user can release the shutter at any moment he or she wants, however, if the exposure time and/or the sensitivity of the first photographing differ from those of the second photographing, the light-shielded image taken after the second photographing may not be appropriate for correcting the image taken in the first photographing.

SUMMARY OF THE INVENTION

In view of the above-described circumstances, the present invention is directed to adaptively obtaining the light-shielded image for correcting for the dark current noise depending on the situation of photographing.

The photographing apparatus according to the invention comprises: photographing means including an image pickup device, the photographing means carrying out first photographing for obtaining a first image with the image pickup device being set in an exposure state, and second photographing for obtaining a second image with the image pickup device being set in a light-shielded state; correcting means for correcting the first image based on the second image to obtain a corrected image; and photographing controlling means for controlling priorities between new first photographing and the second photographing if an instruction for carrying out the new first photographing is given during the second photographing.

The "light-shielded image" refers to an image obtained by photographing with the image pickup device being shielded from light, and has pixel values corresponding to the dark current noise in the entire image pickup device.

It should be noted that, in the photographing apparatus of the invention, the photographing controlling means may further include inputting means for receiving an instruction specifying the priorities between the new first photographing and the second photographing, and the photographing controlling means may control the priorities between the new first photographing and the second photographing according to the instruction inputted via the inputting means.

In the photographing apparatus of the invention, the photographing controlling means may control the priorities between the new first photographing and the second photographing according to an exposure time of the first photographing.

In the photographing apparatus of the invention, the photographing controlling means may control the priorities between the new first photographing and the second photographing according to an exposure time of the first photographing and a photographing time of the second photographing until the instruction for carrying out the new first photographing is given during the second photographing.

In the photographing apparatus of the invention, the photographing controlling means may control the priorities between the new first photographing and the second photographing according to a photographing mode of the first photographing.

In the photographing apparatus of the invention, the photographing controlling means may control the priorities between the new first photographing and the second photographing according to an imaging sensitivity of the first photographing.

In the photographing apparatus of the invention, the photographing controlling means may control the priorities between the new first photographing and the second photographing according to an ambient temperature during the first photographing.

The photographing method according to the invention is for use with a photographing apparatus including photographing means having an image pickup device, the photographing means carrying out first photographing for obtaining a first image with the image pickup device being set in an exposure state and second photographing for obtaining a second image with the image pickup device being set in a light-shielded state, and correcting means for correcting the first image based on the second image to obtain a corrected image, the method comprising: controlling priorities between new first photographing and the second photographing if an instruction for carrying out the new first photographing is given during the second photographing.

It should be noted that the invention may also be implemented in a form of a computer-readable recording medium containing a program for causing a computer to carry out the photographing method.

DESCRIPTION OF THE PREFERRED EMBODIMENTS

Figure 1:
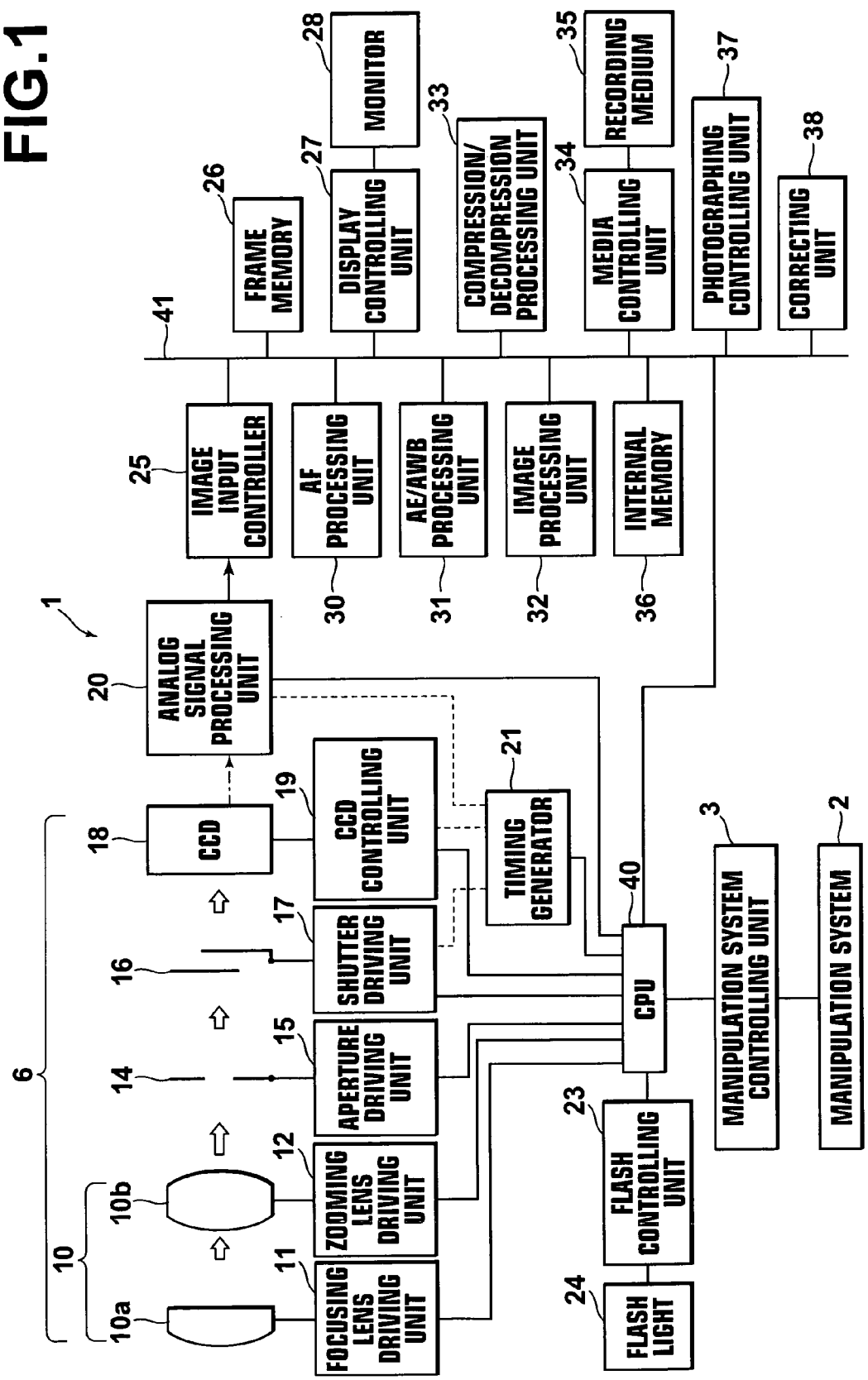
FIG. 1 is a schematic block diagram illustrating the configuration of a digital camera to which a photographing apparatus according to a first embodiment of the present invention is applied.

Hereinafter, embodiments of the present invention will be described with reference to the drawings. FIG. 1 is a schematic block diagram illustrating the configuration of a digital camera 1 according to a first embodiment of the invention. As shown in FIG. 1, the digital camera 1 of this embodiment includes a manipulation system 2, such as an operation mode switch, a zoom lever, a four-directional button, a release button and a power switch, and a manipulation system controlling unit 3 serving as an interface for communicating to a CPU 40 how the manipulation system 2 has been manipulated by the user.

An imaging system 6 include a focusing lens 10a and a zooming lens 10b forming an imaging lens 10. The respective lenses are driven along the optical axis by a focusing lens driving unit 11 and a zooming lens driving unit 12, each formed by a motor and a motor driver. The focusing lens driving unit 11 and the zooming lens driving unit 12 control movement of the lenses based respectively on focus driving amount data outputted from an AF processing unit 30 and on data representing manipulation amount of the zoom lever.

An aperture 14 is driven by an aperture driving unit 15 formed by a motor and a motor driver. The aperture driving unit 15 adjusts the aperture diameter based on aperture value data outputted from an AE/AWB processing unit 31.

The shutter 16 is a mechanical shutter, and is driven by a shutter driving unit 17 formed by a motor and a motor driver. The shutter driving unit 17 controls opening and closing of the shutter 16 according to a signal that is generated when the release button is pressed and shutter speed data that is outputted from the AE/AWB processing unit 31.

A CCD 18, which is an image pickup device, is disposed downstream the optical system. The CCD 18 includes a photoelectric surface formed by a large number of light receiving elements arranged in a form of a two-dimensional array. A light image of the subject passing through the optical system is focused on the photoelectric surface and is subjected to photoelectric conversion. A microlens array for converging the light at each pixel and a color filter array formed by regularly arrayed R, G and B color filters are disposed upstream the photoelectric surface. The CCD 18 outputs electric charges accumulated at the respective pixels line by line as a serial analog imaging signal synchronously with a vertical transfer clock signal and a horizontal transfer clock signal supplied from a CCD controlling unit 19. A time for accumulating the charges at the pixels, i.e., an exposure time, is determined by an electronic shutter driving signal supplied from the CCD controlling unit 19. The CCD controlling unit 19 adjusts a gain of the CCD 18 to provide an analog imaging signal having a predetermined maximum value.

The imaging lens 10, the aperture 14, the shutter 16 and the CCD 18 form the imaging system 6. In a state where the CCD 18 receives no light, dark current is generated in the CCD 18. Therefore, in a case where correction for the dark current noise is set to be carried out as described later, the imaging system 6 carries out light-shielded photographing to obtain a light-shielded image after photographing of a subject (hereinafter referred to as actual photographing) under the control by the CPU 40, by taking an image with the CCD 18 shielded from light for the same length of time (hereinafter referred to as a photographing time) as the exposure time of the actual photographing. It should be noted that the light-shielded image corresponds to the dark current noise in the CCD 18.

The analog imaging signal taken via the CCD 18 is inputted to an analog signal processing unit 20. The analog signal processing unit 20 includes a correlation double sampling circuit (CDS) for removing noise from the analog signal, an automatic gain controller (AGC) for controlling a gain of the analog signal, and an A/D converter (ADC) for converting the analog signal into a digital signal. It should be noted that processing carried out by the analog signal processing unit 20 is referred to as analog signal processing herein. The image data converted into the digital signal is CCD raw data, which includes R, G and B density values at the individual pixels.

The timing generator 21 generates a timing signal. The timing signal is inputted to the shutter driving unit 17, the CCD controlling unit 19 and the analog signal processing unit 20, thereby synchronizing the manipulation of the release button with opening/closing of the shutter 16, transfer of the electric charges of the CCD 18, and processing by the analog signal processing unit 20.

A flash controlling unit 23 causes the flash light 24 to be emitted during photographing.

An image input controller 25 writes the CCD raw data, which is inputted from the analog signal processing unit 20, in a frame memory 26.

The frame memory 26 provides a workspace for various image processing (signal processing) applied to the image data, which will be described later. The frame memory 26 is formed, for example, by a SDRAM (Synchronous Dynamic Random Access Memory) that transfers data synchronously with a bus clock signal having a constant frequency.

A display controlling unit 27 causes the image data stored in the frame memory 26 to be displayed on the monitor 28 as a live view, or causes the image data stored in the recording medium 35 to be displayed on the monitor 28 in the playback mode. It should be noted that the live view is taken at a predetermined time interval with the CCD 18 while the photographing mode is selected.

The AF processing unit 30 and the AE/AWB processing unit 31 determine photographing conditions based on preliminary images. The preliminary images are represented by image data, which is stored in the frame memory 26 when the CPU 40, upon detecting a half-press signal generated when the release button is half pressed, causes the CCD 18 to carry out preliminary photographing.

The AF processing unit 30 detects the focal position based on the preliminary images and outputs the focus driving amount data (AF processing). The focal position may be detected in a passive method, which utilizes the fact that a focused image of a desired subject has a higher contrast value than unfocused images of the subject.

The AE/AWB processing unit 31 measures a brightness of the subject based on the preliminary images, and then determines an ISO sensitivity, an aperture value, a shutter speed, and the like, based on the measured brightness of the subject. The AE/AWB processing unit 31 uses the determined ISO sensitivity data, the aperture value data and the shutter speed data as exposure setting values (AE processing), and automatically adjusts the white balance for photographing (AWB processing). It should be noted that, if the photographing mode is set to a manual mode, the exposure and the white balance can be manually set by the user of the digital camera 1. Even if the exposure and the white balance have been automatically set, the exposure and the white balance can be manually adjusted by the user inputting instructions via the manipulation system 2.

The image processing unit 32 applies, to image data of an actually photographed image, image quality correction processing, such as tone correction, sharpness correction and color correction, and YC processing to convert the CCD raw data into YC data, which is formed by Y data representing a luminance signal, Cb data representing a blue color-difference signal and Cr data representing a red color-difference signal. The actually photographed image is represented by image data, which is taken with the CCD 18 in actual photographing carried out when the release button is fully pressed and is stored in the frame memory 26 via the analog signal processing unit 20 and the image input controller 25. The upper limit for the number of pixels forming the actually photographed image is determined by the number of pixels of the CCD 18. The number of pixels of an image to be recorded can be changed according to setting by the user, such as fine or normal. The number of pixels forming the live view or the preliminary image is smaller than that of the actually photographed image and may be, for example, about $1/16$ of the number of pixels forming the actually photographed image.

A compression/decompression processing unit 33 applies compression processing according to a certain compression format, such as JPEG, to the image data of the actually photographed image that has been subjected to the correction and conversion by the image processing unit 32, to generate an image file. A tag storing accompanying information, such as photographing time and date, is added to the image file, based, for example, on the Exif format. In the playback mode, the compression/decompression processing unit 33 reads out the compressed image file from the recording medium 35 and applies decompression processing to the image file. The decompressed image data is outputted to the monitor 28 and the image represented by the image data is displayed on the monitor 28.

The media controlling unit 34 accesses the recording medium 35 and controls writing and reading of the image file in out of the recording medium 35.

An internal memory 36 stores various constants to be set in the digital camera 1, programs to be executed by the CPU 40, and the like.

In a case where the dark current noise correction is set to be carried out as described later, if a releasing operation for releasing the shutter is made during the light-shielded photographing, a photographing controlling unit 37 control priorities between actual photographing in response to the releasing operation and the light-shielded photographing. In the first embodiment, if a releasing operation is made during the light-shielded photographing, priorities between the actual photographing and the light-shielded photographing is controlled by making the photographer to set the priorities between the actual photographing and the light-shielded photographing via the manipulation system 2.

Figure 2:
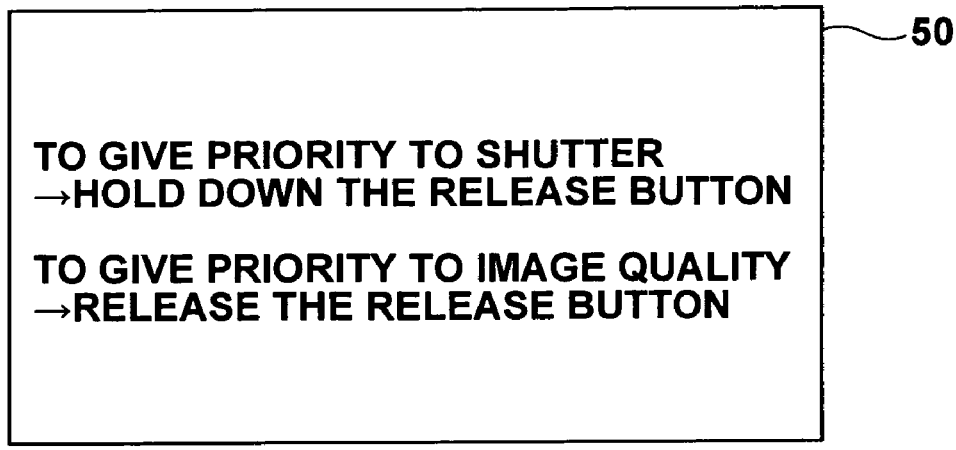
FIG. 2 is a diagram illustrating a priority setting screen.

FIG. 2 illustrates a screen for prompting the user to set the priorities. As shown in FIG. 2, as the releasing operation is made during the light-shielded photographing, the photographing controlling unit 37 displays the priority setting screen 50 on the monitor 28. The priority setting screen 50 contains description of instructions to prompt the user to hold down the release button if he or she wants to give priority to the shutter, or to release the release button if he or she wants to give priority to image quality. The photographer follows the instruction in the priority setting screen 50 and may hold down the release button if he or she wants to stop the light-shielded photographing and carry out photographing, or may release the release button if he or she wants to continue the light-shielded photographing to obtain a high quality image.

It should be noted that, although the priority setting screen 50 of this example prompts the user to hold down or release the release button to set the priorities between the photographing and the correction to obtain a high quality image, the priorities may be set using other component of the manipulation system than the release button, such as the operation mode switch, the zoom lever or the four-directional button.

In the case where the dark current noise correction is set to be carried out, a correcting unit 38 corrects the CCD raw data based on the image data of the light-shielded image.

The CPU 40 controls respective parts of the digital camera 1 according to signals outputted from various processing units such as the manipulation system 2 and the AF processing unit 30. Further, the CPU 40 determines whether or not the dark current noise in the actually photographed image should be corrected based on the photographing conditions determined by the AF processing unit 30 and the AE/AWB processing unit 31. For example, if the exposure time included in the photographing conditions is larger than a predetermined threshold Th0, the dark current noise becomes large and therefore the dark current noise in the actually photographed image is corrected. In contrast, if the exposure time is not more than the threshold Th0, influence of the dark current noise is not significant and therefore the dark current noise in the actually photographed image is not corrected.

A data bus 41 is connected to the image input controller 25, the various processing units, the frame memory 26 and the CPU 40, and communicates the digital image data and the like between these components.

Figure 3:
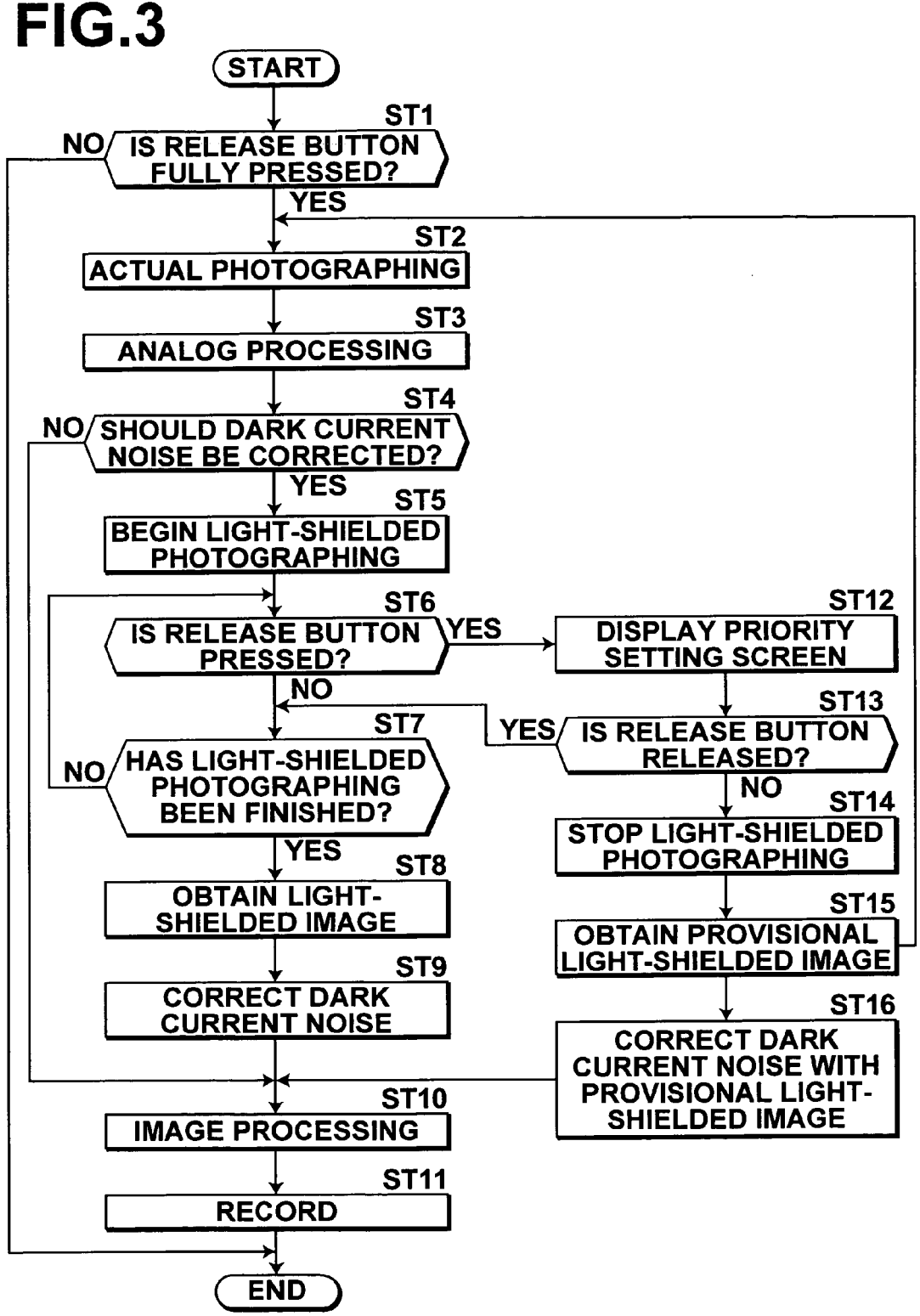
FIG. 3 is a flowchart illustrating a process carried out in the first embodiment.

Now, a process carried out in the first embodiment is described. FIG. 3 is a flowchart illustrating the process carried out in the first embodiment. It should be noted that, here, operations which are carried out after the release button has been half pressed and the AF processing unit 30 and the AE/AWB processing unit 31 have determined the photographing conditions based on the preliminary images are described. The CPU 40 determines whether or not the release button is fully pressed (step ST1). If the determination in step ST1 is negative, the process ends. If the determination in step ST1 is affirmative, the imaging system 6 carries out actual photographing with the exposure time defined in the photographing conditions (step ST2), and the analog signal processing unit 20 applies analog signal processing to the imaging signal obtained by the imaging system 6 to obtain digital CCD raw data (step ST3).

Then, the CPU 40 determines whether or not the dark current noise in the actually photographed image should be corrected based on the photographing conditions determined by the AF processing unit 30 and the AE/AWB processing unit 31 (step ST4). If the determination in step ST4 is negative, the process proceeds to step ST10 described later. If the determination in step ST4 is affirmative, the imaging system 6 begins the light-shielded photographing under the same photographing conditions as those in the actual photographing (step ST5).

Then, the photographing controlling unit 37 determines whether or not the release button is pressed (step ST6). If the determination in step ST6 is negative, determination is made as to whether or not the light-shielded photographing has been finished (step ST7). If the determination in step ST7 is negative, the process returns to step ST6 and operations in step ST6 and the following steps are repeated. If the determination in step ST7 is affirmative, analog signal processing is applied to the imaging signal obtained by the imaging system 6 to obtain a digital light-shielded image (step ST8). Then, the correcting unit 38 subtracts the image data of the light-shielded image from the CCD raw data to correct for the dark current noise in the CCD raw data of the actually photographed image (step ST9). Subsequently, the image processing unit 32 applies image processing to the corrected CCD raw data (step ST10). The thus obtained image data is recorded in the recording medium 35 (step ST11), and the process ends. It should be noted that, if the determination in step ST4 is negative, the image processing unit 32 applies image processing to uncorrected CCD raw data in step ST10.

In contrast, if the determination in step ST6 is affirmative, the photographing controlling unit 37 displays the priority setting screen 50 on the monitor 28 (step ST12), and determination is made as to whether or not the release button is released (step ST13).

If the determination in step ST13 is affirmative, the process proceeds to step ST7 to continue the light-shielded photographing, and the operations in step ST7 and the following steps are repeated. If the determination in step ST13 is negative, i.e., if the release button is held down, the photographing controlling unit 37 stops the light-shielded photographing to carry out photographing in response to the releasing operation (step ST14), and applies analog processing to the imaging signal which has been accumulated at the CCD 18 at that point of time to obtain a digital light-shielded image (step ST15). Then, the process returns to step ST2 and the operations in step ST2 and the following steps are repeated. It should be noted that, unlike the light-shielded image obtained in step ST8, this light-shielded image dose not exactly represent the dark current noise in the actually photographed image, and therefore is referred to as a provisional light-shielded image.

On the other hand, after step ST15, the correcting unit 38 subtracts the image data of the provisional light-shielded image from the CCD raw data to correct for the dark current noise in the CCD raw data of the actually photographed image (step ST16). Then, the process proceeds to step ST10 and the operations in step ST10 and the following steps are repeated.

Figure 4:
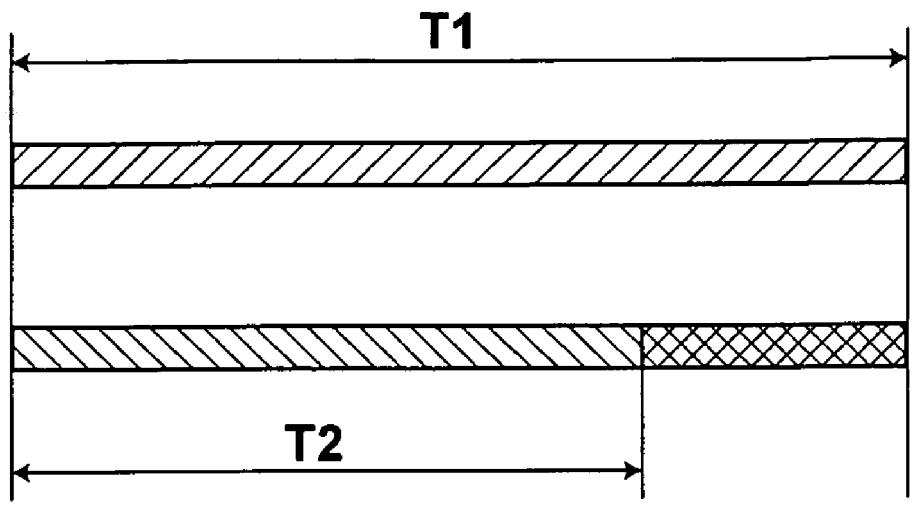
FIG. 4 is a diagram illustrating a relationship between a photographing time of an actually photographed image and a photographing time of a provisional light-shielded image.

It should be noted that, since the exposure time of the provisional light-shielded image is shorter than that of the light-shielded image, pixel values of the pixels of the provisional light-shielded image are smaller than corresponding pixels of the light-shielded image. For example, as shown in FIG. 4, supposing that the exposure time of the light-shielded image, i.e., the actually photographed image, is T1, and the photographing time of the provisional light-shielded image is T2, pixel values of the provisional light-shielded image are smaller than those of the light-shielded image by an amount corresponding to the difference between the photographing times. Therefore, pixel values of the provisional light-shielded image may be multiplied with a ratio T1/T2 of the photographing time T1 of the actually photographed image to the light-shielded photographing time T2 to correct the pixel values of the provisional light-shielded image, and the corrected provisional light-shielded image may be used to correct for the dark current noise in the actually photographed image.

As described above, in the first embodiment, if the release button is pressed during the light-shielded photographing, priority control is carried out between new actual photographing and the light-shielded photographing. Therefore, depending on the situation of photographing, if the user wants to give priority to the image quality of the image obtained by previous actual photographing, the light-shielded photographing can be continued, or if the user wants to carry out photographing immediately without missing the right moment for releasing the shutter, priority can be given to new actual photographing.

It should be noted that, although the priority setting screen 50 is displayed when the release button is pressed during the light-shielded photographing to prompt the photographer to set the priorities between new actual photographing and the light-shielded photographing in the above-described first embodiment, the priorities between new actual photographing and the light-shielded photographing in the event the release button is pressed during the light-shielded photographing may be set in advance.

Next, a second embodiment of the invention will be described. It should be noted that the configuration of the digital camera in the second embodiment is the same as that of the first embodiment, and therefore detailed explanation of the configuration is omitted in the following description. The difference between the second embodiment and the first embodiment lies in that, if the release button is pressed during the light-shielded photographing, determination is made as to whether or not the exposure time of the actual photographing exceeds a predetermined threshold Th1. If the exposure time of the actual photographing exceeds the threshold Th1, the light-shielded photographing is continued. If the exposure time of the actual photographing does not exceed the threshold Th1, priority is given to new actual photographing in response to the releasing operation. It should be noted that the threshold Th1 used in the second embodiment has a value larger than the value of the threshold Th0 which is used for determining whether or not the dark current noise should be corrected.

Figure 5:
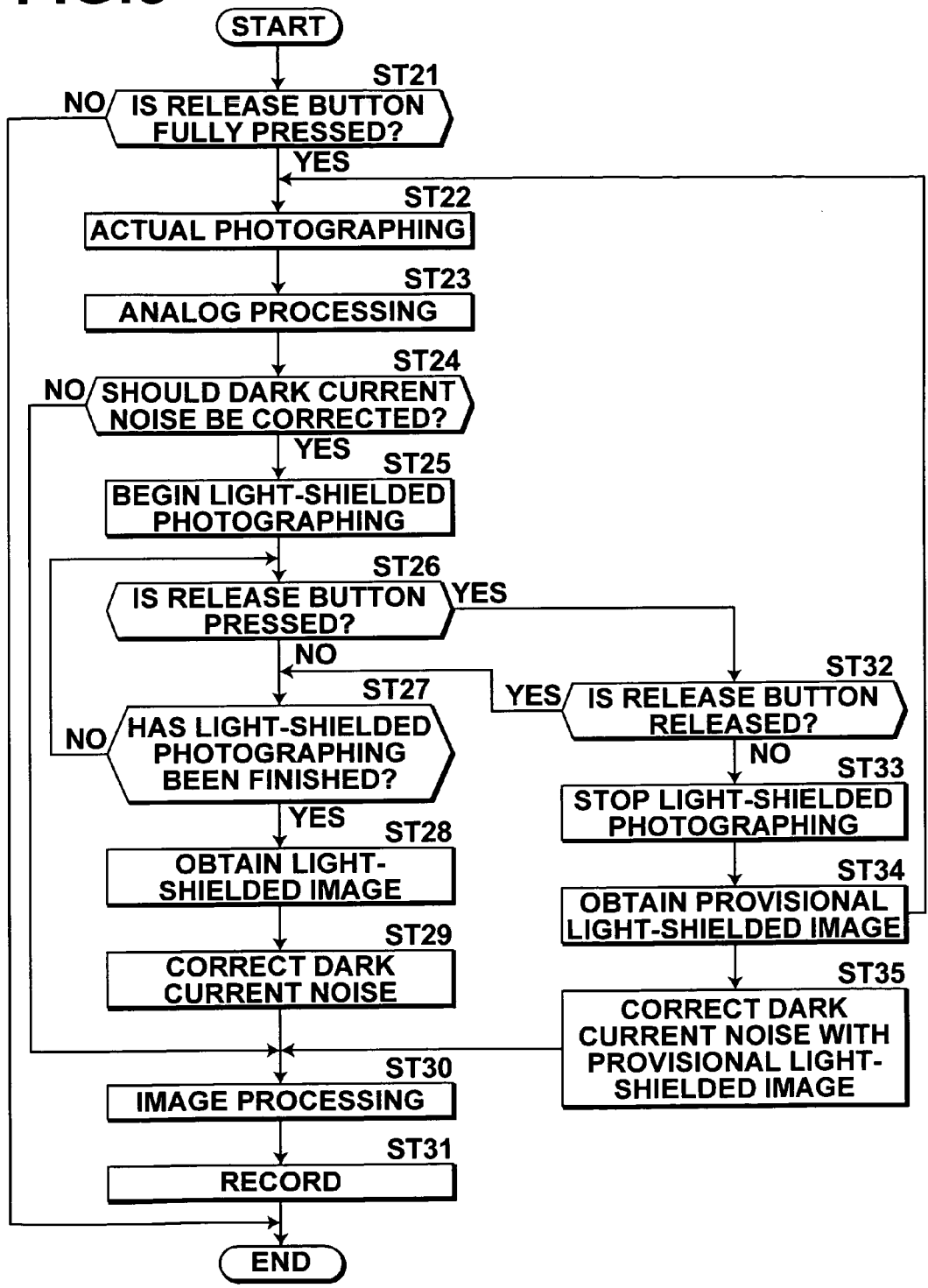
FIG. 5 is a flowchart illustrating a process carried out in a second embodiment.

Now, a process carried out in the second embodiment is described. FIG. 5 is a flowchart illustrating the process carried out in the second embodiment. It should be noted that, here, operations which are carried out after the release button has been half pressed and the AF processing unit 30 and the AE/AWB processing unit 31 have determined the photographing conditions based on the preliminary images are described. The CPU 40 determines whether or not the release button is fully pressed (step ST21). If the determination in step ST21 is negative, the process ends. If the determination in step ST21 is affirmative, the imaging system 6 carries out actual photographing with the exposure time defined in the photographing conditions (step ST22), and the analog signal processing unit 20 applies analog signal processing to the imaging signal obtained by the imaging system 6 to obtain digital CCD raw data (step ST23). It should be noted that the photographing conditions are stored in the internal memory 36.

Then, the CPU 40 determines whether or not the dark current noise in the actually photographed image should be corrected based on the photographing conditions determined by the AF processing unit 30 and the AE/AWB processing unit 31 (step ST24). If the determination in step ST24 is negative, the process proceeds to step ST30 described later. If the determination in step ST24 is affirmative, the imaging system 6 begins the light-shielded photographing under the same photographing conditions as those in the actual photographing (step ST25).

Then, the photographing controlling unit 37 determines whether or not the release button is pressed (step ST26). If the determination in step ST26 is negative, determination is made as to whether or not the light-shielded photographing has been finished (step ST27). If the determination in step ST27 is negative, the process returns to step ST26 and operations in step ST26 and the following steps are repeated. If the determination in step ST27 is affirmative, analog signal processing is applied to the imaging signal obtained by the imaging system 6 to obtain a digital light-shielded image (step ST28). Then, the correcting unit 38 subtracts the image data of the light-shielded image from the CCD raw data to correct for the dark current noise in the CCD raw data of the actually photographed image (step ST29). Subsequently, the image processing unit 32 applies image processing to the corrected CCD raw data (step ST30). The thus obtained image data is recorded in the recording medium 35 (step ST31), and the process ends. It should be noted that, if the determination in step ST24 is negative, the image processing unit 32 applies image processing to uncorrected CCD raw data in step ST30.

In contrast, if the determination in step ST26 is affirmative, the photographing controlling unit 37 determines whether or not the exposure time of the actual photographing exceeds the threshold Th1 (step ST32). If the determination in step ST32 is affirmative, the process proceeds to step ST27 to continue the light-shielded photographing, and the operations in step ST27 and the following steps are repeated. If the determination in step ST32 is negative, the photographing controlling unit 37 stops the light-shielded photographing to carry out photographing in response to the releasing operation (step ST33), and applies analog processing to the imaging signal which has been accumulated at the CCD 18 at that point of time to obtain a digital provisional light-shielded image (step ST34). Then, the process returns to step ST22 and the operations in step ST22 and the following steps are repeated.

On the other hand, after step ST34, the correcting unit 38 subtracts the image data of the provisional light-shielded image from the CCD raw data to correct for the dark current noise in the CCD raw data of the actually photographed image (step ST35). Then, the process proceeds to step ST30 and the operations in step ST30 and the following step are repeated.

The dark current noise becomes higher as the exposure time is longer. Therefore, in the second embodiment, when the release button is pressed during the light-shielded photographing, priority is given to the light-shielded photographing if the exposure time of the actual photographing exceeds the threshold Th1, or priority is given to new actual photographing in response to the releasing operation if the exposure time of the actual photographing does not exceed the threshold Th1. In this manner, if the exposure time exceeds the threshold Th1, the dark current noise is corrected to obtain a high quality image. In contrast, if the exposure time is not more than the threshold Th1, an actually photographed image with low dark current noise is obtained without missing the right moment for releasing the shutter.

Next, a third embodiment of the invention will be described. It should be noted that the configuration of the digital camera in the third embodiment is the same as that of the first embodiment, and therefore detailed explanation of the configuration is omitted in the following description. The difference between the third embodiment and the first embodiment lies in that, if the release button is pressed during the light-shielded photographing, a ratio of T2/T1 of the light-shielded photographing time T2 to the exposure time of the actual photographing T1 from the start of the light-shielded photographing to the point at which the release button is pressed is calculated. Then, determination is made as to whether or not the ratio T2/T1 exceeds a threshold Th2. If the ratio T2/T1 does not exceeds the threshold Th2, the light-shielded photographing is continued. If the ratio T2/T1 exceeds the threshold Th2, priority is given to new actual photographing in response to the releasing operation.

Figure 6:
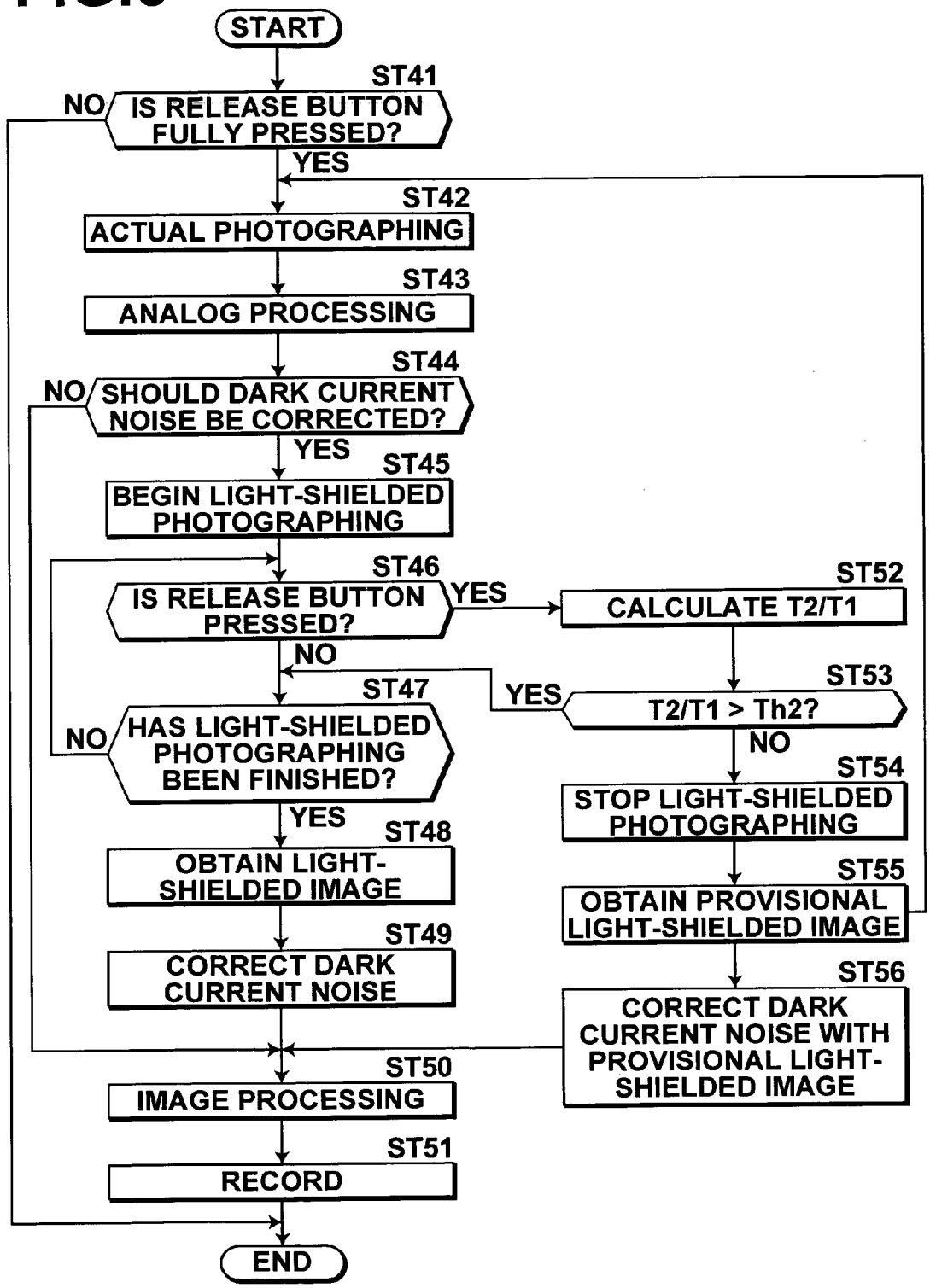
FIG. 6 is a flowchart illustrating a process carried out in a third embodiment.

Now, a process carried out in the third embodiment is described. FIG. 6 is a flowchart illustrating the process carried out in the third embodiment. It should be noted that, here, operations which are carried out after the release button has been half pressed and the AF processing unit 30 and the AE/AWB processing unit 31 have determined the photographing conditions based on the preliminary images are described. The CPU 40 determines whether or not the release button is fully pressed (step ST41). If the determination in step ST41 is negative, the process ends. If the determination in step ST41 is affirmative, the imaging system 6 carries out actual photographing with the exposure time defined in the photographing conditions (step ST42), and the analog signal processing unit 20 applies analog signal processing to the imaging signal obtained by the imaging system 6 to obtain digital CCD raw data (step ST43). It should be noted that the photographing conditions are stored in the internal memory 36.

Then, the CPU 40 determines whether or not the dark current noise in the actually photographed image should be corrected based on the photographing conditions determined by the AF processing unit 30 and the AE/AWB processing unit 31 (step ST44). If the determination in step ST44 is negative, the process proceeds to step ST50 described later. If the determination in step ST44 is affirmative, the imaging system 6 begins the light-shielded photographing under the same photographing conditions as those in the actual photographing (step ST45).

Then, the photographing controlling unit 37 determines whether or not the release button is pressed (step ST46). If the determination in step ST46 is negative, determination is made as to whether or not the light-shielded photographing has been finished (step ST47). If the determination in step ST47 is negative, the process returns to step ST46 and the operations in step ST46 and the following steps are repeated. If the determination in step ST47 is affirmative, analog signal processing is applied to the imaging signal obtained by the imaging system 6 to obtain a digital light-shielded image (step ST48). Then, the correcting unit 38 subtracts the image data of the light-shielded image from the CCD raw data to correct for the dark current noise in the CCD raw data of the actually photographed image (step ST49). Subsequently, the image processing unit 32 applies image processing to the corrected CCD raw data (step ST50). The thus obtained image data is recorded in the recording medium 35 (step ST51), and the process ends. It should be noted that, if the determination in step ST44 is negative, the image processing unit 32 applies image processing to uncorrected CCD raw data in step ST50.

In contrast, if the determination in step ST46 is affirmative, the photographing controlling unit 37 calculates the ratio T2/T1 (step ST52), and determination is made as to whether or not the ratio T2/T1 exceeds the threshold Th2 (step ST53). If the determination in step ST53 is negative, the process proceeds to step ST47 to continue the light-shielded photographing, and the operations in step ST47 and the following steps are repeated. If the determination in step ST53 is affirmative, the photographing controlling unit 37 stops the light-shielded photographing to carry out photographing in response to the releasing operation (step ST54), and applies analog processing to the imaging signal which has been accumulated at the CCD 18 at that point of time to obtain a digital provisional light-shielded image (step ST55). Then, the process returns to step ST42 and the operations in step ST42 and the following steps are repeated.

On the other hand, after step ST55, the correcting unit 38 subtracts the image data of the provisional light-shielded image from the CCD raw data to correct for the dark current noise in the CCD raw data of the actually photographed image (step ST56). Then, the process proceeds to step ST50 and operations in step ST50 and the following step are repeated.

The dark current noise increases proportionally to the exposure time T1. Therefore, more accurate correction for the dark current noise can be achieved as the difference between the photographing time T2 of the light-shielded photographing and the exposure time T1 of the actual photographing is smaller. However, even if the T1 and T2 are not perfectly the same, if the difference between the photographing time T2 of the light-shielded photographing and the exposure time T1 of the actual photographing is smaller than a certain amount, relatively accurate dark current noise correction can be achieved.

In the third embodiment, when the release button is pressed during the light-shielded photographing, the ratio of T2/T1 of the light-shielded photographing time T2 to the exposure time of the actual photographing T1 is calculated, and determination is made as to whether or not the ratio T2/T1 exceeds the threshold Th2. Priority is given to the light-shielded photographing if the ratio T2/T1 does not exceed the threshold Th2, or priority is given to actual photographing in response to the releasing operation if the ratio T2/T1 exceeds the threshold Th2. In this manner, when the ratio T2/T1 exceeds the threshold Th2, a high quality image with the corrected dark current noise can be obtained without missing the right moment for releasing the shutter.

Next, a fourth embodiment of the invention will be described. It should be noted that the configuration of the digital camera in the fourth embodiment is the same as that of the first embodiment, and therefore detailed explanation of the configuration is omitted in the following description. The difference between the fourth embodiment and the first embodiment lies in that, if the release button is pressed during the light-shielded photographing, determination is made as to whether or not the photographing mode of the actual photographing is a predetermined photographing mode. If the photographing mode is the predetermined photographing mode, the light-shielded photographing is continued. If the photographing mode is not the predetermined photographing mode, priority is given to new actual photographing in response to the releasing operation.

It should be noted that the predetermined photographing mode may include a mode which uses a long exposure time and results in relatively high dark current noise, such as a long exposure mode or a night scene mode.

Figure 7:
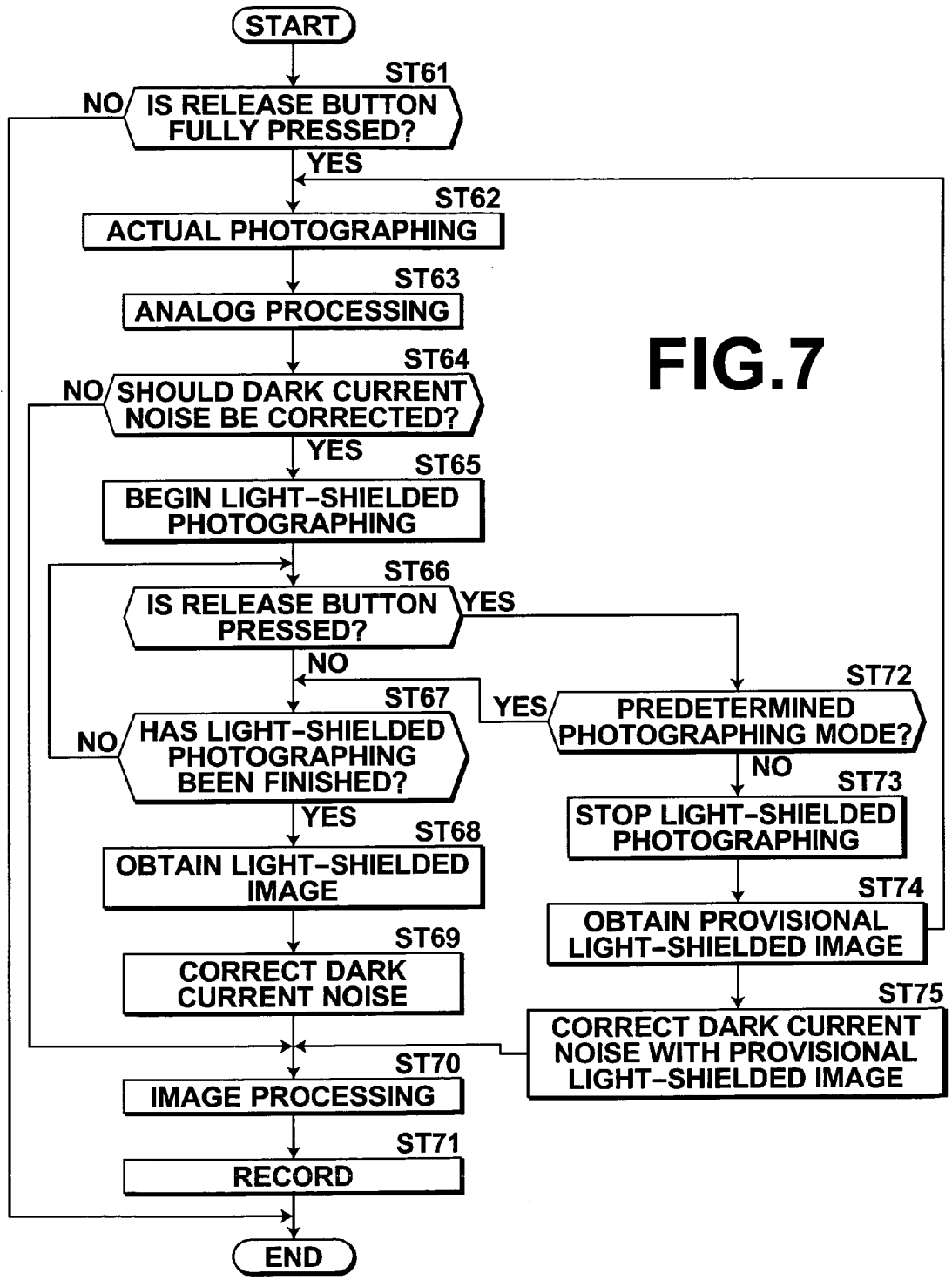
FIG. 7 is a flowchart illustrating a process carried out in a fourth embodiment.

Now, a process carried out in the fourth embodiment is described. FIG. 7 is a flowchart illustrating the process carried out in the fourth embodiment. It should be noted that, in the process of the fourth embodiment, only a determination operation in step ST72 differs from the determination operation in step S32 of the second embodiment, and other operations in steps ST61 to ST75 are the same as those in steps ST21 to ST35 of the second embodiment and therefore are not explained in detail.

In the fourth embodiment, the photographing controlling unit 37 determines whether or not the photographing mode of the actual photographing is the predetermined photographing mode in step ST72 corresponding to step ST32 of the second embodiment. If the determination in step ST72 is affirmative, i.e., the photographing mode of the actual photographing is the predetermined photographing mode, the process proceeds to step ST67 to continue the light-shielded photographing, and operations in step ST67 and the following steps are repeated. If the determination in step ST72 is negative, the light-shielded photographing is stopped to carry out new actual photographing in response to the releasing operation, and the process proceeds to step ST73 to carry out the operations in step ST73 and the following steps.

The dark current noise is higher as the exposure time is longer. Therefore, in the fourth embodiment, when the release button is pressed during the light-shielded photographing, priority is given to the light-shielded photographing if the photographing mode of the actual photographing is the predetermined photographing mode, or priority is given to new actual photographing in response to the releasing operation if the photographing mode of the actual photographing is not the predetermined photographing mode. In this manner, if the photographing mode is the mode which results in high dark current noise, a high quality image with the corrected dark current noise is obtained. In contrast, if the photographing mode is a mode other than the predetermined photographing mode, an actually photographed image with low dark current noise is obtained without missing the right moment for releasing the shutter.

Next, a fifth embodiment of the invention will be described. It should be noted that the configuration of the digital camera in the fifth embodiment is the same as that of the first embodiment, and therefore detailed explanation of the configuration is omitted in the following description. The difference between the fifth embodiment and the first embodiment lies in that, if the release button is pressed during the light-shielded photographing, determination is made as to whether or not the imaging sensitivity of the actual photographing exceeds a predetermined threshold Th3. If the imaging sensitivity exceeds the threshold Th3, the light-shielded photographing is continued. If the imaging sensitivity is not more than the threshold Th3, priority is given to new actual photographing in response to the releasing operation.

It should be noted that the imaging sensitivity may be ISO sensitivity or Sv (Film Speed Value), and Sv is used in this example.

Figure 8:
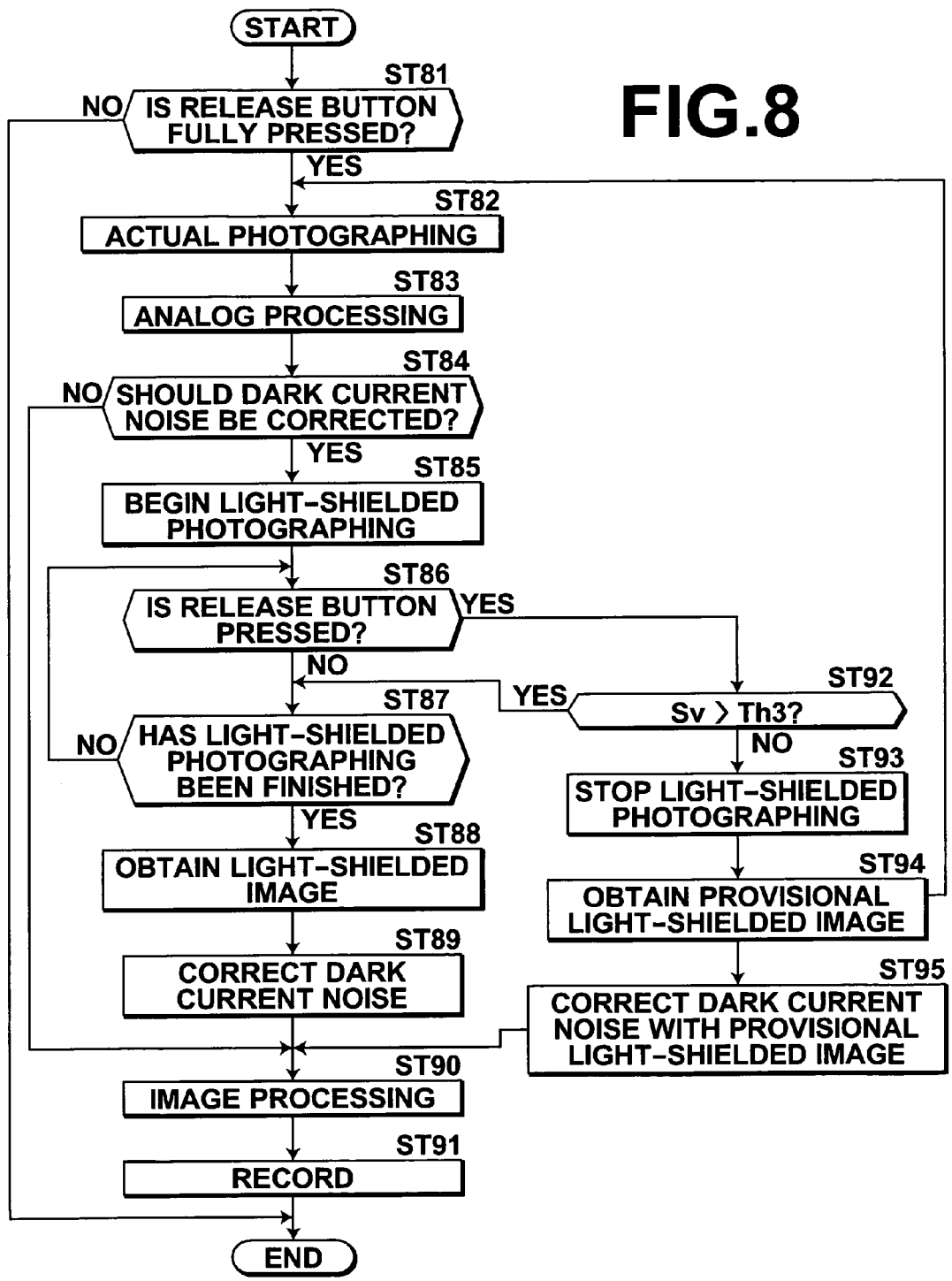
FIG. 8 is a flowchart illustrating a process carried out in a fifth embodiment.

Now, a process carried out in the fifth embodiment is described. FIG. 8 is a flowchart illustrating the process carried out in the fifth embodiment. It should be noted that, in the process of the fifth embodiment, only a determination operation in step ST92 differs from the determination operation in step S32 of the second embodiment, and other operations in steps ST81 to ST95 are the same as those in steps ST21 to ST35 of the second embodiment and are not explained in detail.

In the fifth embodiment, the photographing controlling unit 37 determines whether or not the Sv of the actual photographing exceeds the threshold Th3 in step ST92 corresponding to step ST32 of the second embodiment. If the determination in step ST92 is affirmative, i.e., the Sv of the actual photographing exceeds the threshold Th3, the process proceeds to step ST87 to continue the light-shielded photographing, and operations in step ST87 and the following steps are repeated. If the determination in step ST92 is negative, the light-shielded photographing is stopped to carry out new actual photographing in response to the releasing operation, and the process proceeds to step ST93 to carry out the operations in step ST93 and the following steps.

The dark current noise is higher as the imaging sensitivity is higher. Therefore, in the fifth embodiment, when the release button is pressed during the light-shielded photographing, priority is given to the light-shielded photographing if the imaging sensitivity of the actual photographing exceeds the threshold Th3, or priority is given to new actual photographing in response to the releasing operation if the imaging sensitivity is not more than the threshold Th3. In this manner, if the photographing mode is a mode to carry out high sensitivity photographing which results in high dark current noise, a high quality image with the corrected dark current noise is obtained. In contrast, if the photographing mode is a mode to carry out low sensitivity photographing, an actually photographed image with low dark current noise is obtained without missing the right moment for releasing the shutter.

Figure 9:
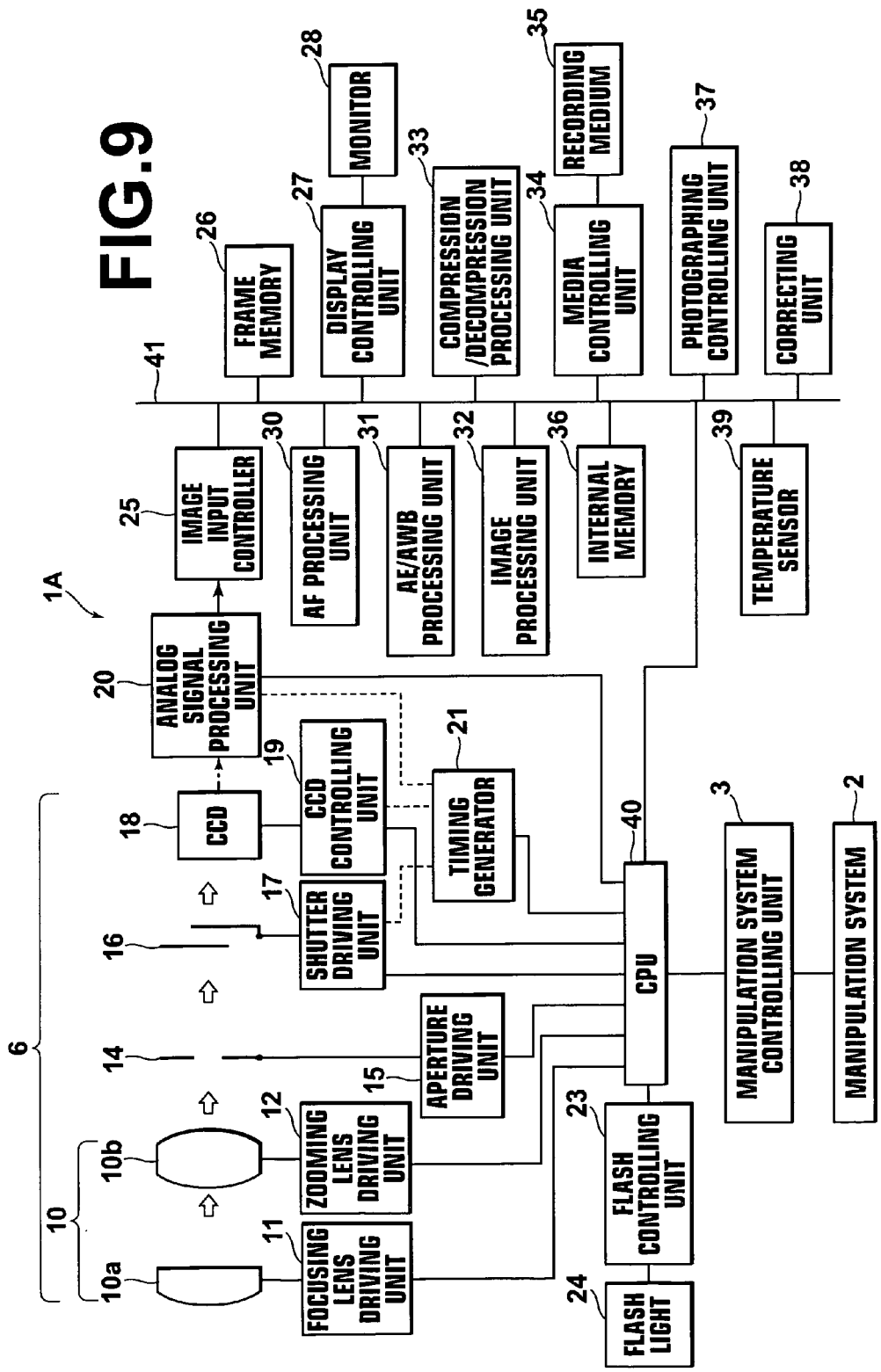
FIG. 9 is schematic block diagram illustrating the configuration of a digital camera to which a photographing apparatus according to a sixth embodiment of the invention is applied.

Next, a sixth embodiment of the invention will be described. FIG. 9 is a schematic block diagram illustrating the configuration of a digital camera according to the sixth embodiment of the invention. It should be noted that components of the digital camera of the sixth embodiment which are the same as those of the first embodiment are designated by the same reference numerals and detailed explanation thereof is omitted. The difference between the sixth embodiment and the first embodiment lies in that the digital camera 1A of the sixth embodiment further includes a temperature sensor 39 for measuring ambient temperature, and if the release button is pressed during the light-shielded photographing, determination is made as to whether the ambient temperature during the actual photographing exceeds a predetermined threshold Th4. If the ambient temperature exceeds the threshold Th4, the light-shielded photographing is continued. If the ambient temperature is not more than the threshold Th4, priority is given to new actual photographing in response to the releasing operation.

Figure 10:
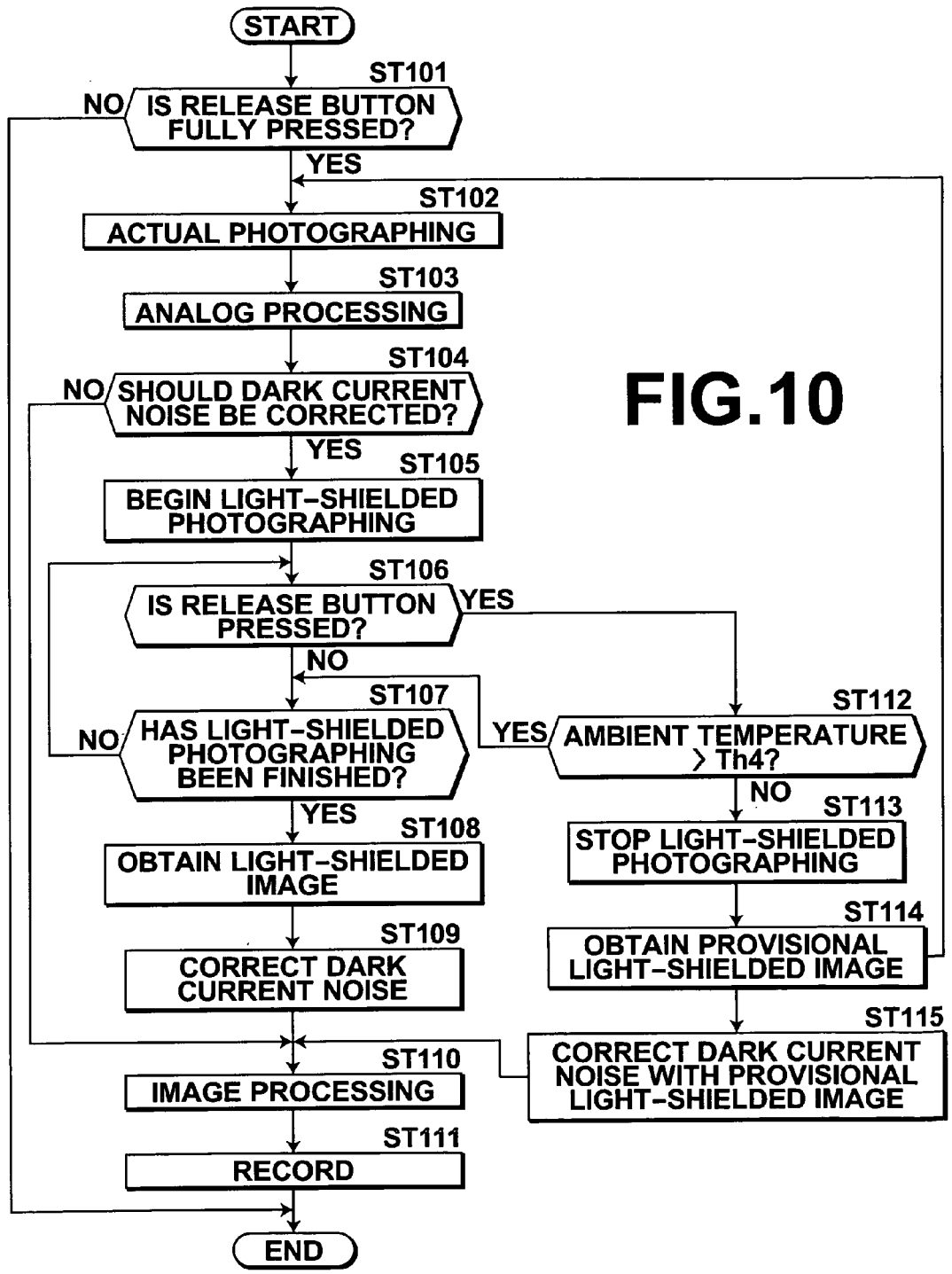
FIG. 10 is a flowchart illustrating a process carried out in the sixth embodiment.

Now, a process carried out in the sixth embodiment is described. FIG. 10 is a flowchart illustrating the process carried out in the sixth embodiment. It should be noted that, in the process of the sixth embodiment, only a determination operation in step ST112 differs from the determination operation in step S32 of the second embodiment, and other operations in steps ST101 to ST115 are the same as those in steps ST21 to ST35 of the second embodiment and are not explained in detail.

In the sixth embodiment, the photographing controlling unit 37 determines whether or not the ambient temperature during the actual photographing exceeds the threshold Th4 in step ST112 corresponding to step ST32 of the second embodiment. If the determination in step ST112 is affirmative, i.e., the ambient temperature during the actual photographing exceeds the threshold Th4, the process proceeds to step ST107 to continue the light-shielded photographing, and operations in step ST107 and the following steps are repeated. If the determination in step ST112 is negative, the light-shielded photographing is stopped to carry out new actual photographing in response to the releasing operation, and the process proceeds to step ST113 to carry out the operations in step ST113 and the following steps.

The dark current noise is higher as the ambient temperature is higher. Therefore, in sixth embodiment, when the release button is pressed during the light-shielded photographing, priority is given to the light-shielded photographing if the ambient temperature during the actual photographing exceeds the threshold Th4, or priority is given to new actual photographing in response to the releasing operation if the ambient temperature is not more than the threshold Th4. In this manner, if the ambient temperature is a temperature that results in high dark current noise, a high quality image with the corrected dark current noise is obtained. In contrast, if the ambient temperature is sufficiently low, an actually photographed image with low dark current noise is obtained without missing the right moment for releasing the shutter.

The digital cameras according to the embodiments of the invention have been described above. However, the present invention may also be implemented in a form of a program for causing a computer to function as means corresponding to the photographing controlling unit 37 and the correcting unit 38 to carry out any of the processes shown in FIGS. 3, 5-8, and 9. Further, the invention may also be implemented in a form of a computer readable recording medium containing such a program.

According to the present invention, if an instruction for carrying out new first photographing is given during the second photographing, priority control is carried out between the new first photographing and the second photographing. Therefore, depending on the situation of photographing, if the user wants to obtain a high quality image in the first photographing, the priority is given to the second photographing, or if the user wants to take another image immediately without missing the right moment for releasing the shutter, the priority is given to the new first photographing.

What is claimed is:
1. A photographing apparatus comprising:
  photographing means including an image pickup device, the photographing means carrying out first photographing for obtaining a first image with the image pickup device being set in an exposure state, and second photographing for obtaining a second image with the image pickup device being set in a light-shielded state;
  correcting means for correcting the first image based on the second image to obtain a corrected image; and
  photographing controlling means for controlling priorities between a new first photographing and the second photographing if an instruction for carrying out the new first photographing is given during the second photographing,
  wherein the photographing controlling means further includes inputting means for receiving an instruction specifying the priorities between the new first photographing and the second photographing, and the photographing controlling means controls the priorities between the new first photographing and the second photographing according to the instruction inputted via the inputting means.
2. A photographing method for use with a photographing apparatus of claim 1, the method comprising:
  carrying out first photographing for obtaining a first image with an image pickup device being set in an exposure state, and second photographing for obtaining a second image with the image pickup device being set in a light-shielded state;

correcting the first image based on the second image to obtain a corrected image;
controlling priorities between new first photographing and the second photographing if an instruction for carrying out the new first photographing is given during the second photographing;
receiving an input instruction specifying the priorities between the new first photographing and the second photographing; and
controlling the priorities between the new first photographing and the second photographing according to the instruction inputted.

3. A computer-readable recording medium containing a program for causing a computer to carry out a photographing method for use with a photographing apparatus of claim 1, the program comprising instructions for:
carrying out first photographing for obtaining a first image with an image pickup device being set in an exposure state, and second photographing for obtaining a second image with the image pickup device being set in a light-shielded state;
correcting the first image based on the second image to obtain a corrected image;
controlling priorities between new first photographing and the second photographing if an instruction for carrying out the new first photographing is given during the second photographing;
receiving an input instruction specifying the priorities between the new first photographing and the second photographing; and
controlling the priorities between the new first photographing and the second photographing according to the instruction inputted.

4. A photographing apparatus comprising:
photographing means including an image pickup device, the photographing means carrying out first photographing for obtaining a first image with the image pickup device being set in an exposure state, and second photographing for obtaining a second image with the image pickup device being set in a light-shielded state;
correcting means for correcting the first image based on the second image to obtain a corrected image; and
photographing controlling means for controlling priorities between a new first photographing and the second photographing if an instruction for carrying out the new first photographing is given during the second photographing,
wherein the photographing controlling means controls the priorities between the new first photographing and the second photographing according to an exposure time of the first photographing.

5. A photographing method for use with a photographing apparatus of claim 4, the method comprising:
carrying out first photographing for obtaining a first image with an image pickup device being set in an exposure state, and second photographing for obtaining a second image with the image pickup device being set in a light-shielded state;
correcting the first image based on the second image to obtain a corrected image;
controlling priorities between new first photographing and the second photographing if an instruction for carrying out the new first photographing is given during the second photographing; and
controlling the priorities between the new first photographing and the second photographing according to an exposure time of the first photographing.

6. A computer-readable recording medium containing a program for causing a computer to carry out a photographing method for use with a photographing apparatus of claim 4, the program comprising instructions for:
carrying out first photographing for obtaining a first image with an image pickup device being set in an exposure state, and second photographing for obtaining a second image with the image pickup device being set in a light-shielded state;
correcting the first image based on the second image to obtain a corrected image;
controlling priorities between new first photographing and the second photographing if an instruction for carrying out the new first photographing is given during the second photographing; and
controlling the priorities between the new first photographing and the second photographing according to an exposure time of the first photographing.

7. A photographing apparatus comprising:
photographing means including an image pickup device, the photographing means carrying out first photographing for obtaining a first image with the image pickup device being set in an exposure state, and second photographing for obtaining a second image with the image pickup device being set in a light-shielded state;
correcting means for correcting the first image based on the second image to obtain a corrected image; and
photographing controlling means for controlling priorities between a new first photographing and the second photographing if an instruction for carrying out the new first photographing is given during the second photographing,
wherein the photographing controlling means controls the priorities between the new first photographing and the second photographing according to an exposure time of the first photographing and a photographing time of the second photographing until the instruction for carrying out the new first photographing is given during the second photographing.

8. A photographing method for use with a photographing apparatus of claim 7, the method comprising:
carrying out first photographing for obtaining a first image with an image pickup device being set in an exposure state, and second photographing for obtaining a second image with the image pickup device being set in a light-shielded state;
correcting the first image based on the second image to obtain a corrected image;
controlling priorities between new first photographing and the second photographing if an instruction for carrying out the new first photographing is given during the second photographing; and
controlling the priorities between the new first photographing and the second photographing according to an exposure time of the first photographing and a photographing time of the second photographing until the instruction for carrying out the new first photographing is given during the second photographing.

9. A computer-readable recording medium containing a program for causing a computer to carry out a photographing method for use with a photographing apparatus of claim 7, the program comprising instructions for:
carrying out first photographing for obtaining a first image with an image pickup device being set in an exposure state, and second photographing for obtaining a second image with the image pickup device being set in a light-shielded state;

correcting the first image based on the second image to obtain a corrected image;

controlling priorities between new first photographing and the second photographing if an instruction for carrying out the new first photographing is given during the second photographing; and controlling the priorities between the new first photographing and the second photographing according to an exposure time of the first photographing and a photographing time of the second photographing until the instruction for carrying out the new first photographing is given during the second photographing.

10. A photographing apparatus comprising:

photographing means including an image pickup device, the photographing means carrying out first photographing for obtaining a first image with the image pickup device being set in an exposure state, and second photographing for obtaining a second image with the image pickup device being set in a light-shielded state;

correcting means for correcting the first image based on the second image to obtain a corrected image; and photographing controlling means for controlling priorities between a new first photographing and the second photographing if an instruction for carrying out the new first photographing is given during the second photographing, wherein the photographing controlling means controls the priorities between the new first photographing and the second photographing according to a photographing mode of the first photographing.

11. A photographing method for use with a photographing apparatus of claim 10, the method comprising:

carrying out first photographing for obtaining a first image with an image pickup device being set in an exposure state, and second photographing for obtaining a second image with the image pickup device being set in a light-shielded state;

correcting the first image based on the second image to obtain a corrected image;

controlling priorities between new first photographing and the second photographing if an instruction for carrying out the new first photographing is given during the second photographing; and controlling the priorities between the new first photographing and the second photographing according to a photographing mode of the first photographing.

12. A computer-readable recording medium containing a program for causing a computer to carry out a photographing method for use with a photographing apparatus of claim 10, the program comprising instructions for:

carrying out first photographing for obtaining a first image with an image pickup device being set in an exposure state, and second photographing for obtaining a second image with the image pickup device being set in a light-shielded state;

correcting the first image based on the second image to obtain a corrected image;

controlling priorities between new first photographing and the second photographing if an instruction for carrying out the new first photographing is given during the second photographing, and controlling the priorities between the new first photographing and the second photographing according to a photographing mode of the first photographing.

13. A photographing apparatus comprising:

photographing means including an image pickup device, the photographing means carrying out first photographing for obtaining a first image with the image pickup device being set in an exposure state, and second photographing for obtaining a second image with the image pickup device being set in a light-shielded state;

correcting means for correcting the first image based on the second image to obtain a corrected image; and photographing controlling means for controlling priorities between a new first photographing and the second photographing if an instruction for carrying out the new first photographing is given during the second photographing, wherein the photographing controlling means controls the priorities between the new first photographing and the second photographing according to an imaging sensitivity of the first photographing.

14. A photographing method for use with a photographing apparatus of claim 13, the method comprising:

carrying out first photographing for obtaining a first image with an image pickup device being set in an exposure state, and second photographing for obtaining a second image with the image pickup device being set in a light-shielded state;

correcting the first image based on the second image to obtain a corrected image;

controlling priorities between new first photographing and the second photographing if an instruction for carrying out the new first photographing is given during the second photographing; and controlling the priorities between the new first photographing and the second photographing according to an image sensitivity of the first photographing.

15. A computer-readable recording medium containing a program for causing a computer to carry out a photographing method for use with a photographing apparatus of claim 13, the program comprising instructions for:

carrying out first photographing for obtaining a first image with an image pickup device being set in an exposure state, and second photographing for obtaining a second image with the image pickup device being set in a light-shielded state;

correcting the first image based on the second image to obtain a corrected image;

controlling priorities between new first photographing and the second photographing if an instruction for carrying out the new first photographing is given during the second photographing; and controlling the priorities between the new first photographing and the second photographing according to an image sensitivity of the first photographing.

16. A photographing apparatus comprising:

photographing means including an image pickup device, the photographing means carrying out first photographing for obtaining a first image with the image pickup device being set in an exposure state, and second photographing for obtaining a second image with the image pickup device being set in a light-shielded state;

correcting means for correcting the first image based on the second image to obtain a corrected image; and photographing controlling means for controlling priorities between a new first photographing and the second photographing if an instruction for carrying out the new first photographing is given during the second photographing, wherein the photographing controlling means controls the priorities between the new first photographing and the second photographing according to an ambient temperature during the first photographing.

17. A photographing method for use with a photographing apparatus of claim 16, the method comprising:
  carrying out first photographing for obtaining a first image with an image pickup device being set in an exposure state, and second photographing for obtaining a second image with the image pickup device being set in a light-shielded state;
  correcting the first image based on the second image to obtain a corrected image;
  controlling priorities between new first photographing and the second photographing if an instruction for carrying out the new first photographing is given during the second photographing; and
  controlling the priorities between the new first photographing and the second photographing according to an ambient temperature during the first photographing.

18. A computer-readable recording medium containing a program for causing a computer to carry out a photographing method for use with a photographing apparatus of claim 16, the program comprising instructions for:
  carrying out first photographing for obtaining a first image with an image pickup device being set in an exposure state, and second photograph for obtaining a second image with the image pickup device being set in a light-shielded state;
  correcting the first image based on the second image to obtain a corrected image;
  controlling priorities between new first photographing and the second photographing if an instruction for carrying out the new first photographing is given during the second photographing; and
  controlling the priorities between the new first photographing and the second photographing according to an ambient temperature during the first photographing.

* * * * *